US011543916B2

United States Patent
Chang et al.

(10) Patent No.: US 11,543,916 B2
(45) Date of Patent: Jan. 3, 2023

(54) DRIVER CIRCUIT FOR DRIVING DISPLAY PANEL HAVING TOUCH SENSING FUNCTION

(71) Applicant: HIMAX TECHNOLOGIES LIMITED, Tainan (TW)

(72) Inventors: Pei Yao Chang, Tainan (TW); Yaw-Guang Chang, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 0 days.

(21) Appl. No.: 17/560,207

(22) Filed: Dec. 22, 2021

(65) Prior Publication Data
US 2022/0261134 A1 Aug. 18, 2022

Related U.S. Application Data

(60) Provisional application No. 63/150,090, filed on Feb. 17, 2021.

(51) Int. Cl.
*G06F 3/041* (2006.01)
*G09G 3/20* (2006.01)

(52) U.S. Cl.
CPC ........ *G06F 3/04182* (2019.05); *G06F 3/0412* (2013.01); *G06F 3/04184* (2019.05); *G09G 3/2092* (2013.01); *G09G 2310/0289* (2013.01)

(58) Field of Classification Search
CPC ..... G06F 3/041–0412; G06F 2203/041–04114
See application file for complete search history.

(56) References Cited

U.S. PATENT DOCUMENTS 10,802,648 B1   10/2020   Wang et al.

FOREIGN PATENT DOCUMENTS

| CN | 107024955 A | * | 8/2017 | ............... G05F 1/56 |
| CN | 111243540 | | 6/2020 | |
| TW | 201629716 A | * | 8/2016 | ........... G06F 3/0412 |

OTHER PUBLICATIONS

"Search Report of Europe Counterpart Application", dated Jun. 24, 2022, pp. 1-8.

* cited by examiner

*Primary Examiner* — Sanjiv D. Patel
(74) *Attorney, Agent, or Firm* — JCIPRNET

(57) ABSTRACT

A driver circuit configured to drive a display panel to perform a display operation and a touch sensing operation is provided. The driver circuit includes a touch and display driver integration (TDDI) circuit and an external circuit. The TDDI circuit is configured to drive the display panel to perform the display operation and the touch sensing operation during a display period and a touch sensing period, respectively. The TDDI circuit outputs a reference signal. The external circuit is disposed outside of the TDDI circuit. The external circuit is configured to output a first output voltage and a second output voltage on the basis of the reference signal from the TDDI circuit. The first output voltage is larger than the second output voltage.

13 Claims, 7 Drawing Sheets

DRIVER CIRCUIT FOR DRIVING DISPLAY PANEL HAVING TOUCH SENSING FUNCTION

CROSS-REFERENCE TO RELATED APPLICATION

This application claims the priority benefit of U.S. Provisional application Ser. No. 63/150,090, filed on Feb. 17, 2021. The entirety of the above-mentioned patent application is hereby incorporated by reference herein and made a part of this specification.

BACKGROUND

Technical Field

The invention relates to a driver circuit, more specifically, to a driver circuit adapted to drive a display panel to perform a display operation and a touch sensing operation.

Description of Related Art

In some applications, electronic devices may have a display function and a touch sensing function for better user experience. Users can operate the electronic devices by touching a display panel with touch sensors to perform some desirable function. For such an application, two driver chips are required to drive the display panel with touch sensors to perform a display operation and a touch sensing operation. In related arts, for cost down issue, the two driver chips are integrated into a touch and display driver integration (TDDI) chip. The TDDI chip can drive the display panel with touch sensors to perform the display operation and the touch sensing operation.

Conventional TDDI chips usually include high voltage devices to provide driving signals to the display panel. However, the high voltage devices may generate electromagnetic interference, and other components of the TDDI chips may be affected. In addition, the high voltage devices also increase temperature variation of the TDDI chips.

SUMMARY

The invention is directed to a driver circuit, where temperature variation of TDDI chips and electromagnetic interference due to high voltage devices can be reduced.

The invention provides a driver circuit, configured to drive a display panel to perform a display operation and a touch sensing operation. The driver circuit includes a TDDI circuit and an external circuit. The TDDI circuit is configured to drive the display panel to perform the display operation and the touch sensing operation during a display period and a touch sensing period, respectively. The TDDI circuit outputs a reference signal. The external circuit is disposed outside of the TDDI circuit. The external circuit is configured to output a first output voltage and a second output voltage on the basis of the reference signal from the TDDI circuit. The first output voltage is larger than the second output voltage.

In an embodiment of the invention, the driver circuit further includes a power supply circuit. The power supply circuit is coupled to the external circuit. The power supply circuit is configured to output a first input voltage and a second input voltage. The external circuit receives the first input voltage and the second input voltage from the power supply circuit. The first input voltage is larger than the second input voltage.

In an embodiment of the invention, the external circuit generates the first output voltage on the basis of the reference signal according to the first input voltage. The external circuit generates the second output voltage on the basis of the reference signal according to the second input voltage.

In an embodiment of the invention, the external circuit includes a switch device controlled by a first control signal. The switch device is turned on by the first control signal during the display period. The switch device is turned off by the first control signal during the touch sensing period.

In an embodiment of the invention, the switch device has a first voltage endurance, and the TDDI circuit has a second voltage endurance. The first voltage endurance is larger than the second voltage endurance.

In an embodiment of the invention, the external circuit further includes a diode device, a first capacitor and a second capacitor. The diode device includes a first end and a second end. The first end of the diode device is coupled to the power supply circuit. The first end of the diode device serves as an input end to receive the first input voltage. The second end of the diode device serves as an output end to output the first output voltage. The first capacitor includes a first end and a second end. The first end of the first capacitor is coupled to the second end of the diode device, and the second end of the first capacitor is coupled to the TDDI circuit to receive the reference voltage. The second capacitor includes a first end and a second end. The first end of the second capacitor is coupled to the second end of the first capacitor, and the second end of the second capacitor is coupled to the switch device. The switch device includes a first end, a second end and a control end. The first end of the switch device is coupled to the second end of the second capacitor. The first end of the switch device serves as an output end to output the second output voltage. The second end of the switch device serves as an input end to receive the second input voltage. The control end of the switch device is coupled to the first control signal.

In an embodiment of the invention, the switch device includes a first end, a second end and a control end. The first end of the switch device is coupled to the power supply circuit. The first end of the switch device serves as an input end to receive the first input voltage. The second end of the switch device serves as an output end to output the first output voltage. The external circuit further includes a first capacitor, a second capacitor and a diode device. The first capacitor includes a first end and a second end. The first end of the first capacitor is coupled to the second end of the switch device, and the second end of the first capacitor is coupled to the TDDI circuit to receive the reference voltage. The second capacitor includes a first end and a second end. The first end of the second capacitor is coupled to the second end of the first capacitor. The diode device includes a first end and a second end. The first end of the diode device is coupled to the second end of the second capacitor. The first end of the diode device serves as an output end to output the second output voltage. The second end of the diode device serves as an output end to receive the second input voltage.

In an embodiment of the invention, the driver circuit further includes a first level shifter. The first level shifter is coupled to the TDDI circuit. The TDDI circuit outputs a second control signal to the first level shifter. The first level shifter is configured to receive the second control signal and further receive the first input voltage or the second input voltage. The first level shifter generates the first control signal on the basis of the first input voltage or the second input voltage according to the second control signal.

In an embodiment of the invention, the first level shifter is disposed in the external circuit.

In an embodiment of the invention, the driver circuit further includes a second level shifter. The second level shifter is coupled to the external circuit and disposed outside of the external circuit. The second level shifter is configured to receive the first output voltage and the second output voltage from the external circuit. The first level shifter is disposed outside of the external circuit and integrated with the second level shifter to form a semiconductor chip.

In an embodiment of the invention, the TDDI circuit and the power supply circuit are implemented as different semiconductor chips.

In an embodiment of the invention, the reference signal is a ground voltage during the display period.

In an embodiment of the invention, the reference signal is a synchronization-driving voltage during the touch sensing period.

In an embodiment of the invention, the first output voltage and the second output voltage have the same amplitude, phase and frequency as that of the reference signal.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
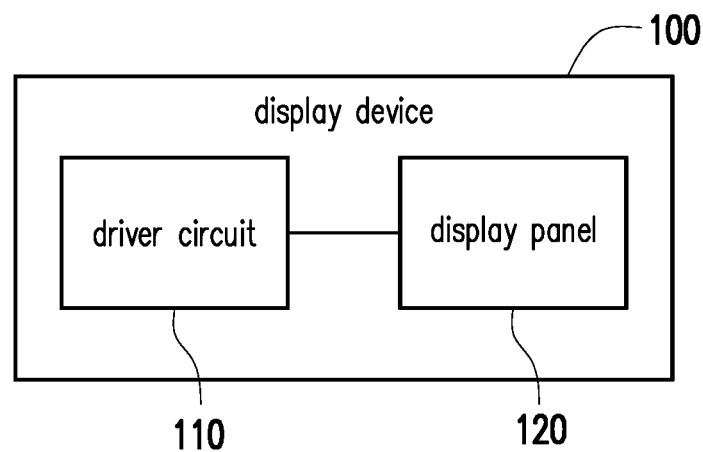
FIG. 1 is a schematic block diagram illustrating a display device according to an embodiment of the invention.

FIG. 1 is a schematic block diagram illustrating a display device according to an embodiment of the invention. Referring to FIG. 1, the display device 100 of the present embodiment includes a driver circuit 110 and a display panel 120. The display panel 120 includes touch sensors and display pixels (not shown). The driver circuit 110 is configurable to be coupled to the display panel 120. The electronic circuit 110 is adapted to drive the display panel 120 to perform a display operation and a touch sensing operation.

Figure 2:
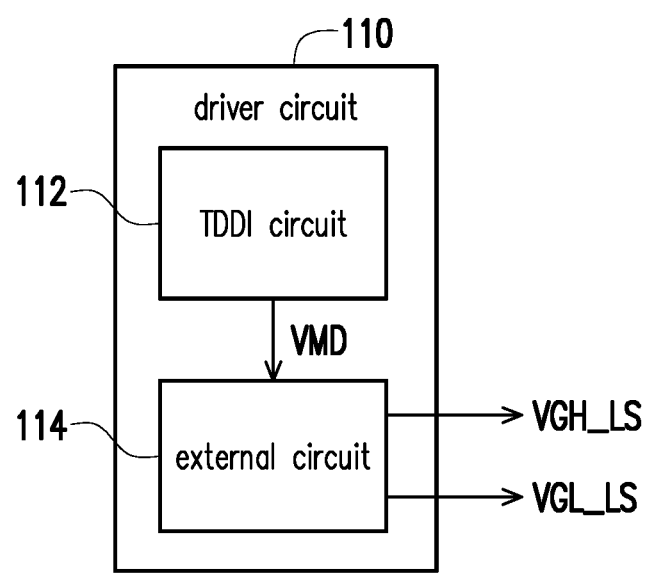
FIG. 2 is a schematic block diagram illustrating the driver circuit of FIG. 1 according to an embodiment of the invention.

FIG. 2 is a schematic block diagram illustrating the driver circuit of FIG. 1 according to an embodiment of the invention. Referring to FIG. 2, the driver circuit 110 is configured to drive the display panel 120 to perform the display operation and the touch sensing operation. The driver circuit 110 includes a touch and display driver integration (TDDI) circuit 112 and an external circuit 114. The external circuit 114 is disposed outside of the TDDI circuit 112. In an embodiment, the TDDI circuit 112 may implemented as a single semiconductor chip.

To be specific, the TDDI circuit 112 is configured to drive the display panel 120 to perform the display operation and the touch sensing operation during a display period and a touch sensing period, respectively. The TDDI circuit 112 outputs a reference signal VMD to the external circuit 114. The external circuit 114 is configured to output a first output voltage VGH_LS and a second output voltage VGL_LS on the basis of the reference signal VMD from the TDDI circuit 112. In the present embodiment, the first output voltage VGH_LS is larger than the second output voltage VGL_LS.

Figure 3:
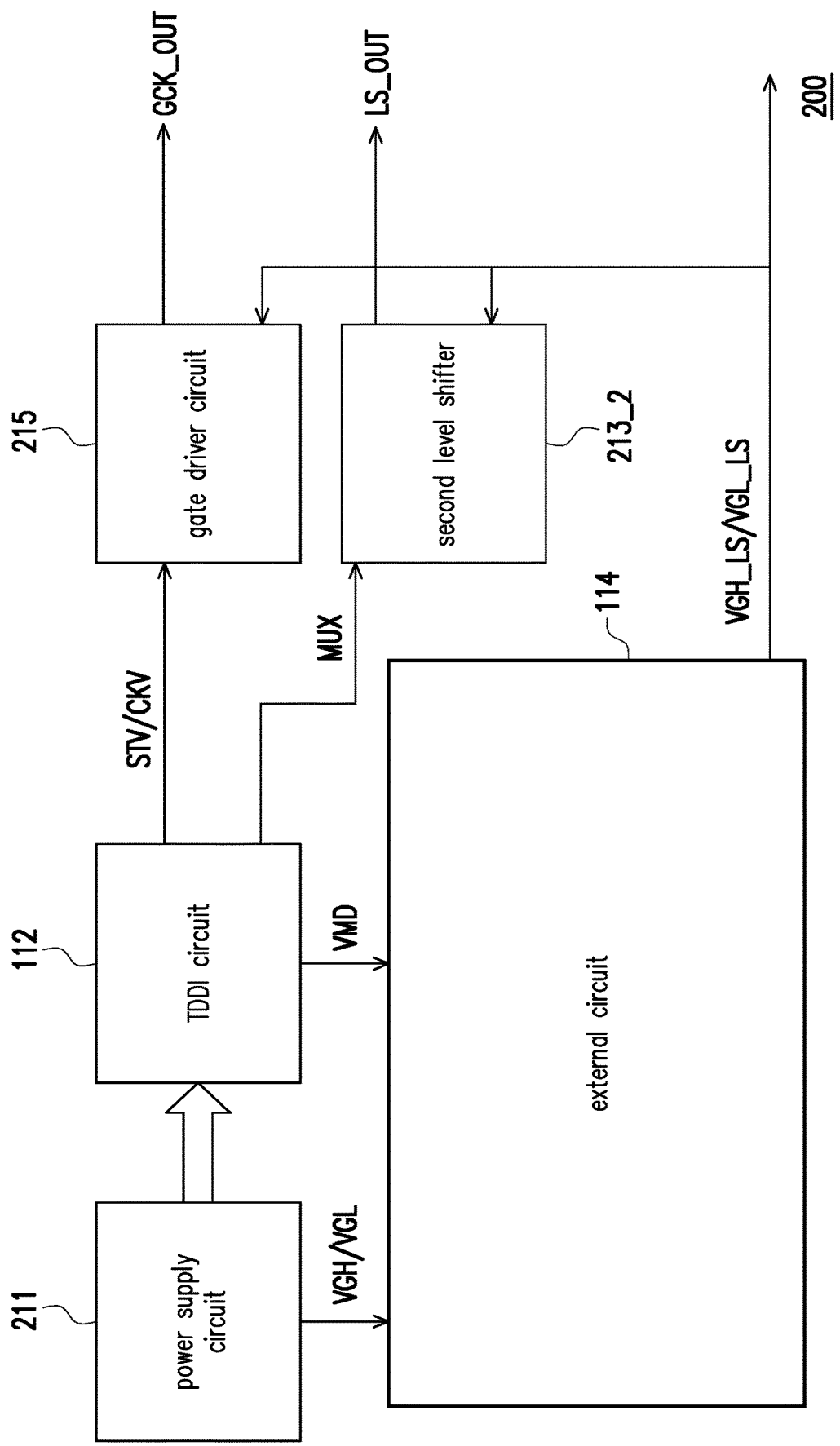
FIG. 3 is a schematic block diagram illustrating a driver circuit according to another embodiment of the invention.

FIG. 3 is a schematic block diagram illustrating a driver circuit according to another embodiment of the invention. Referring to FIG. 3, the driver circuit 200 includes the TDDI circuit 112, the external circuit 114, a power supply circuit 211, a second level shifter 213_2 and a gate driver circuit 215. The power supply circuit 211 is coupled to the external circuit 114. In an embodiment, the TDDI circuit 112, the external circuit 114, the power supply circuit 211, the second level shifter 213_2 and the gate driver circuit 215 may be implemented as different semiconductor chips, but the invention is not limited thereto.

To be specific, the power supply circuit 211 is configured to output a first input voltage VGH and a second input voltage VGL to the external circuit 114. The first input voltage VGH is larger than the second input voltage VGL. The external circuit 114 receives the first input voltage VGH and the second input voltage VGL from the power supply circuit 211. The external circuit 114 generates the first output voltage VGH_LS on the basis of the reference signal VMD according to the first input voltage VGH. The external circuit 114 generates the second output voltage VGL_LS on the basis of the reference signal VMD according to the second input voltage VGL. The external circuit 114 outputs the first output voltage VGH_LS and the second output voltage VGL_LS to the second level shifter 213_2 and the gate driver circuit 215.

The second level shifter 213_2 is coupled to the external circuit 114 and the TDDI circuit 112. The second level shifter 213_2 is disposed outside of the external circuit 114. The second level shifter 213_2 is configured to receive the first output voltage VGH_LS and the second output voltage VGL_LS from the external circuit 114. The TDDI circuit 112 outputs a selecting signal MUX to the second level shifter 213_2. The second level shifter 213_2 selects one of the first output voltage VGH_LS and the second output voltage VGL_LS as an output LS OUT to drive the display panel 120. In an embodiment, the second level shifter 213_2 may be implemented as a single semiconductor chip, but the invention is not limited thereto.

The gate driver circuit 215 is coupled to the external circuit 114 and the TDDI circuit 112. The gate driver circuit 215 is configured to receive the first output voltage VGH_LS and the second output voltage VGL_LS from the external circuit 114. The TDDI circuit 112 outputs a start pulse signal STV and a clock signal CKV to the gate driver circuit 215. The gate driver circuit 215 generates an output GCK_OUT to drive scan lines on the display panel 120 according to the start pulse signal STV and the clock signal CKV. In an embodiment, the gate driver circuit 215 may be implemented as a single semiconductor chip and disposed on the display panel 120, but the invention is not limited thereto.

Figure 4A:
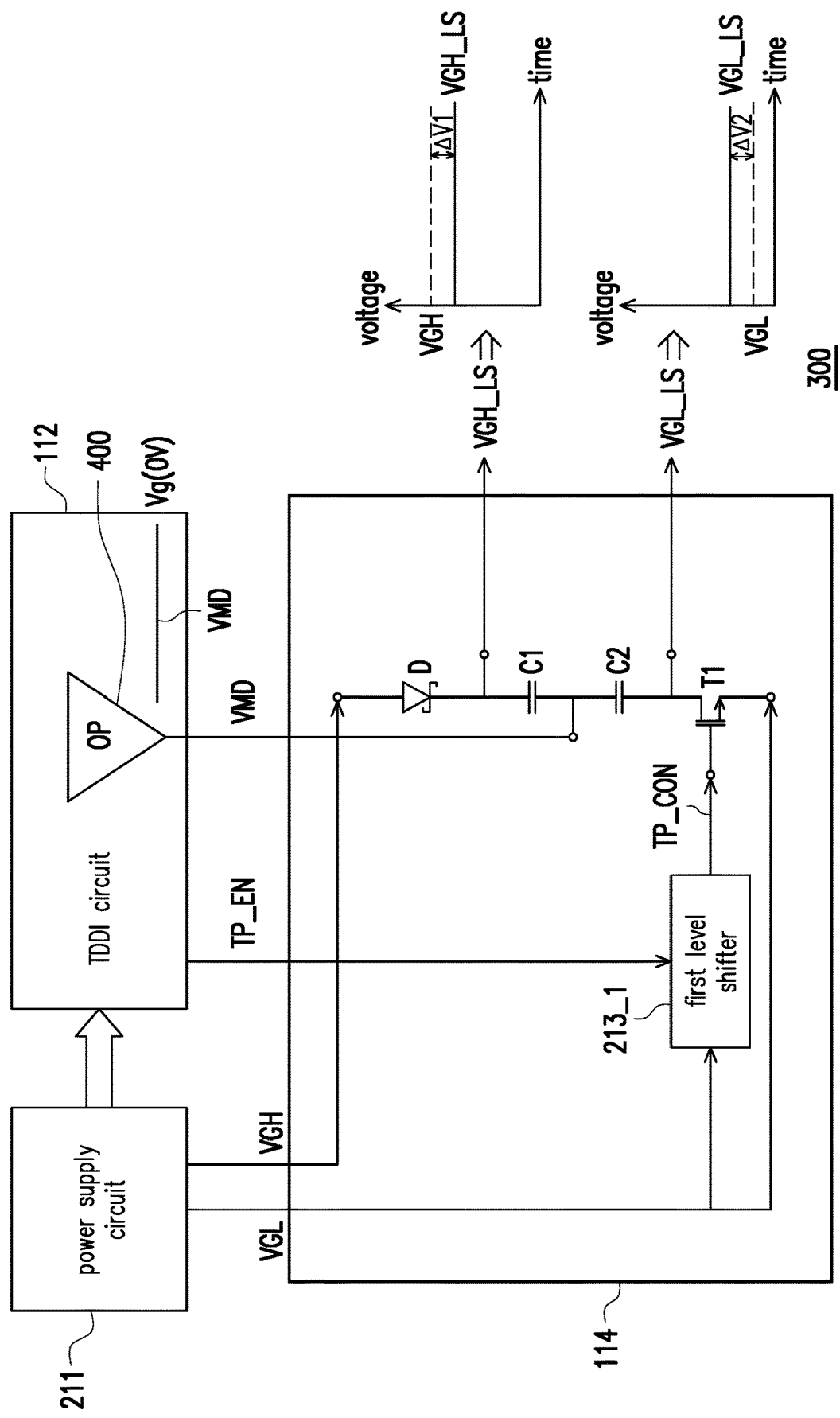
FIG. 4A is a schematic block diagram illustrating a driver circuit operating in a display period according to an embodiment of the invention.

FIG. 4A is a schematic block diagram illustrating a driver circuit operating in a display period according to an embodiment of the invention. Referring to FIG. 4A, the driver circuit 300 includes the TDDI circuit 112, the external circuit 114, the power supply circuit 211 and a first level shifter 213_1. The first level shifter 213_1 is coupled to the TDDI circuit 112 and disposed in the external circuit 114.

The external circuit 114 includes a diode device D, a first capacitor C1, a second capacitor C2 and a switch device T1. The diode device D, the first capacitor C1, the second capacitor C2 and the switch device T1 are connected in series. To be specific, the diode device D includes a first end and a second end. The first end of the diode device D is coupled to the power supply circuit 211. The first end of the diode device D serves as an input end to receive the first input voltage VGH. The second end of the diode device D is coupled to a first end of the first capacitor C1. The second end of the diode device D serves as an output end to output the first output voltage VGH_LS. The first capacitor C1 includes the first end and a second end. The first end of the first capacitor C1 is coupled to the second end of the diode device D. The second end of the first capacitor C1 is coupled to the TDDI circuit 112 to receive the reference voltage VMD from an output buffer 400 of the TDDI circuit 112. The second capacitor C2 includes a first end and a second end. The first end of the second capacitor C2 is coupled to the second end of the first capacitor C1. The second end of the second capacitor C2 is coupled to the switch device T1.

The switch device T1 includes a first end, a second end and a control end. The first end of the switch device T1 is coupled to the second end of the second capacitor C2. The first end of the switch device T1 serves as an output end to output the second output voltage VGL_LS. The second end of the switch device T1 is coupled to the power supply circuit 211. The second end of the switch device T1 serves as an input end to receive the second input voltage VGL. The control end of the switch device T1 is coupled to a first control signal TP_CON.

The switch device T1 is controlled by the first control signal TP_CON. The switch device T1 is turned on by the first control signal TP_CON during the display period, and the switch device T1 is turned off by the first control signal TP_CON during the touch sensing period.

The TDDI circuit 112 outputs a second control signal TP_EN to the first level shifter 213_1. The first level shifter 213_1 is configured to receive the second control signal TP_EN the second input voltage VGL. The first level shifter 213_1 generates the first control signal TP_CON on the basis of the second input voltage VGL according to the second control signal TP_EN.

In the present embodiment, the driver circuit 300 operates in the display period. The TDDI circuit 112 outputs the second control signal TP_EN to control the first level shifter 213_1 to operate in the display period. In the display period, the reference signal VMD is set as a ground voltage Vg. That is to say, the TDDI circuit 112 outputs the ground voltage Vg as the reference signal VMD. The first output voltage VGH_LS is substantially equal to the first input voltage VGH. A voltage difference ΔV1 of the first output voltage VGH_LS and the first input voltage VGH is a turned-on voltage of the diode device D. In the present embodiment, the diode device D may be a Schottky diode, but the invention is not limited thereto.

On the other hand, the switch device T1 is turned on by the first control signal TP_CON in the display period. The second output voltage VGL_LS is substantially equal to the second input voltage VGL. A voltage difference ΔV2 of the second output voltage VGL_LS and the second input voltage VGL is a drain-to-source voltage of the switch device T1. In the present embodiment, the switch device T1 may be a high voltage N-type metal oxide semiconductor (HVN-MOS) transistor, but the invention is not limited thereto.

Figure 4B:
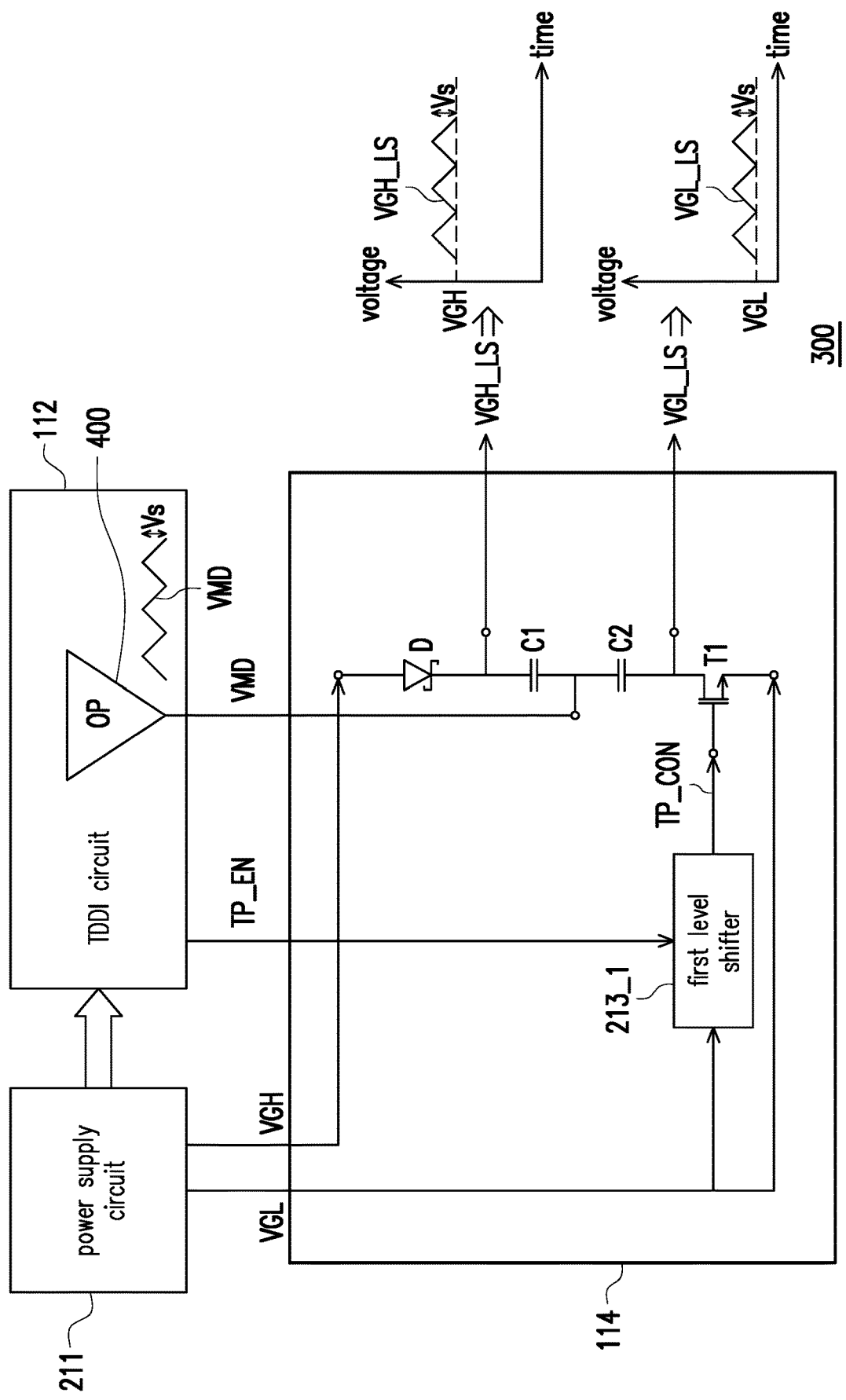
FIG. 4B is a schematic block diagram illustrating the driver circuit of FIG. 4A operating in a touch sensing period according to an embodiment of the invention.

FIG. 4B is a schematic block diagram illustrating the driver circuit of FIG. 4A operating in a touch sensing period according to an embodiment of the invention. Referring to FIG. 4B, the driver circuit 300 operates in the touch sensing period. The TDDI circuit 112 outputs the second control signal TP_EN to control the first level shifter 213_1 to operate in the touch sensing period. In the touch sensing period, the reference signal VMD is a synchronization-driving voltage Vs. That is to say, the TDDI circuit 112 outputs the synchronization-driving voltage Vs as the reference signal VMD. In the present embodiment, the synchronization-driving voltage Vs may be a triangle wave as illustrated in FIG. 4B, but the invention is not limited thereto. In an embodiment, the synchronization-driving voltage Vs may be a square wave or a sine wave. The synchronization-driving voltage Vs may be a positive voltage or a negative voltage.

The first output voltage VGH_LS is generated on the basis of the synchronization-driving voltage Vs according to the first input voltage VGH. The first output voltage VGH_LS is also a triangle wave having a minimum reference level equal to the first input voltage VGH.

On the other hand, the switch device T1 is turned off by the first control signal TP_CON in the touch sensing period. The second output voltage VGL_LS is generated on the basis of the synchronization-driving voltage Vs according to the second input voltage VGL. The first output voltage VGH_LS is also a triangle wave having a minimum reference level equal to the second input voltage VGL.

The first output voltage VGH_LS and the second output voltage VGL_LS have the same amplitude, phase and frequency as that of the reference signal, i.e. the synchronization-driving voltage Vs, as illustrated in FIG. 4B. In the touch sensing period, the synchronization-driving voltage Vs from the TDDI circuit 112 is outputted to the display panel 120 to drive scan lines and/or data lines to reduce noises when the touch sensing operation is performed.

Figure 5:
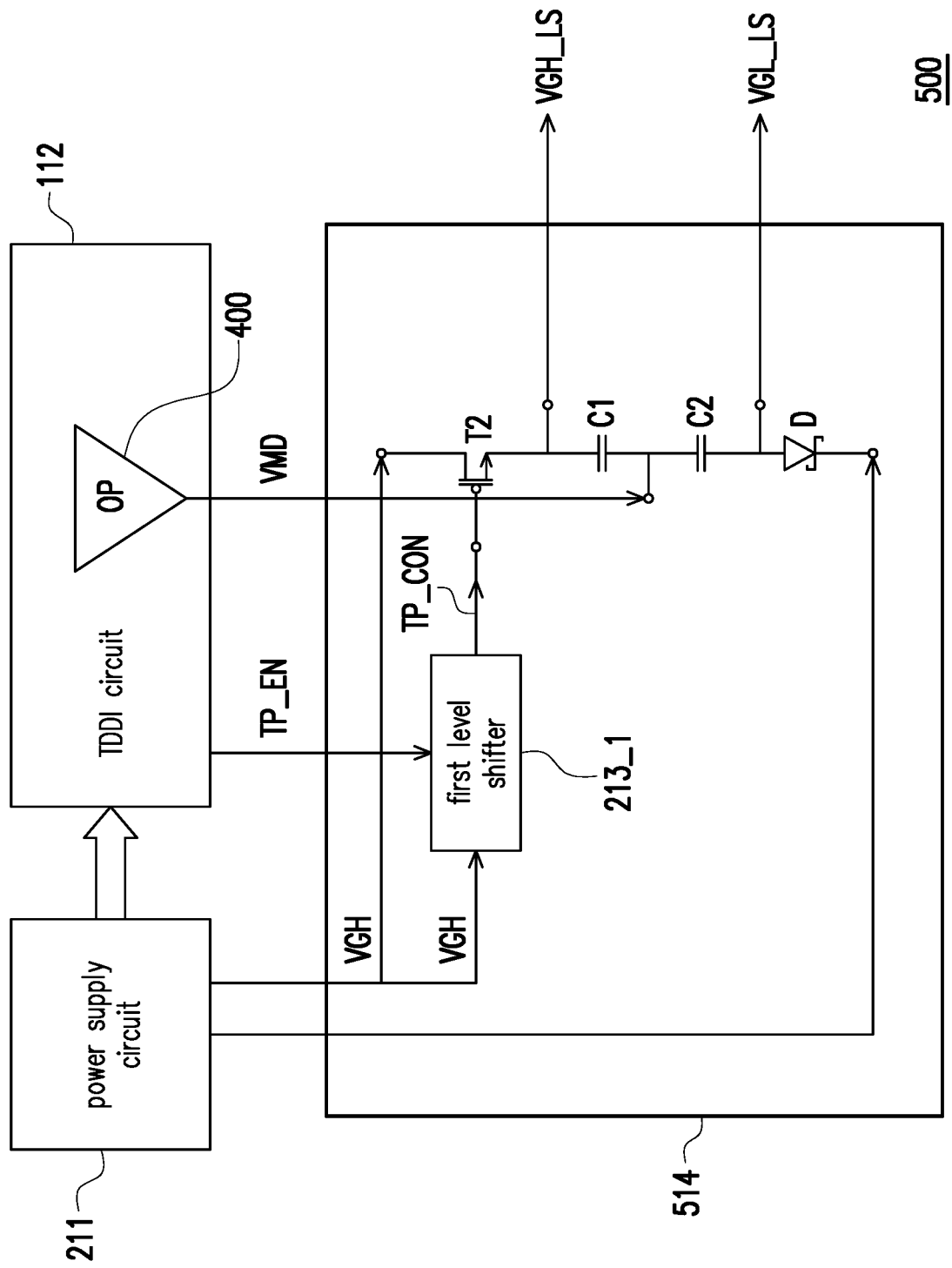
FIG. 5 is a schematic block diagram illustrating a driver circuit according to another embodiment of the invention.

FIG. 5 is a schematic block diagram illustrating a driver circuit according to another embodiment of the invention. Referring to FIG. 5, the driver circuit 500 includes the TDDI circuit 112, an external circuit 514, the power supply circuit 211 and a first level shifter 213_1. The first level shifter 213_1 is coupled to the TDDI circuit 112 and disposed in the external circuit 514.

The external circuit 514 includes a switch device T2, a first capacitor C1, a second capacitor C2 and a diode device D. The switch device T2, the first capacitor C1, the second capacitor C2 and the diode device D are connected in series. To be specific, the switch device T2 includes a first end, a second end and a control end. The first end of the switch device T2 is coupled to the power supply circuit 211. The first end of the switch device T2 serves as an input end to receive the first input voltage VGH. The second end of the switch device T2 is coupled to the first end of the first capacitor C1. The second end of the switch device T2 serves as an output end to output the first output voltage VGH_LS. The control end of the switch device T2 is coupled to the first control signal TP_CON.

The switch device T2 is controlled by the first control signal TP_CON. The switch device T2 is turned on by the first control signal TP_CON during the display period, and the switch device T1 is turned off by the first control signal TP_CON during the touch sensing period. In the present embodiment, the switch device T2 may be a high voltage P-type metal oxide semiconductor (HVPMOS) transistor, but the invention is not limited thereto.

The TDDI circuit 112 outputs the second control signal TP_EN to the first level shifter 213_1. The first level shifter 213_1 is configured to receive the second control signal TP_EN the first input voltage VGH. The first level shifter 213_1 generates the first control signal TP_CON on the basis of the first input voltage VGH according to the second control signal TP_EN.

The first capacitor C1 includes the first end and a second end. The first end of the first capacitor C1 is coupled to the second end of the switch device T2. The second end of the first capacitor C1 is coupled to the TDDI circuit 112 to receive the reference voltage VMD from an output buffer 400 of the TDDI circuit 112. The second capacitor C2 includes a first end and a second end. The first end of the second capacitor C2 is coupled to the second end of the first capacitor C1. The second end of the second capacitor C2 is coupled to the diode device D. The diode device D includes a first end and a second end. The first end of the diode device D is coupled to the second end of the second capacitor C2. The first end of the diode device D serves as an output end to output the second output voltage VGL_LS. The second end of the diode device D is coupled to the power supply circuit 211. The second end of the diode device D serves as an input end to receive the second input voltage VGL.

Figure 6:
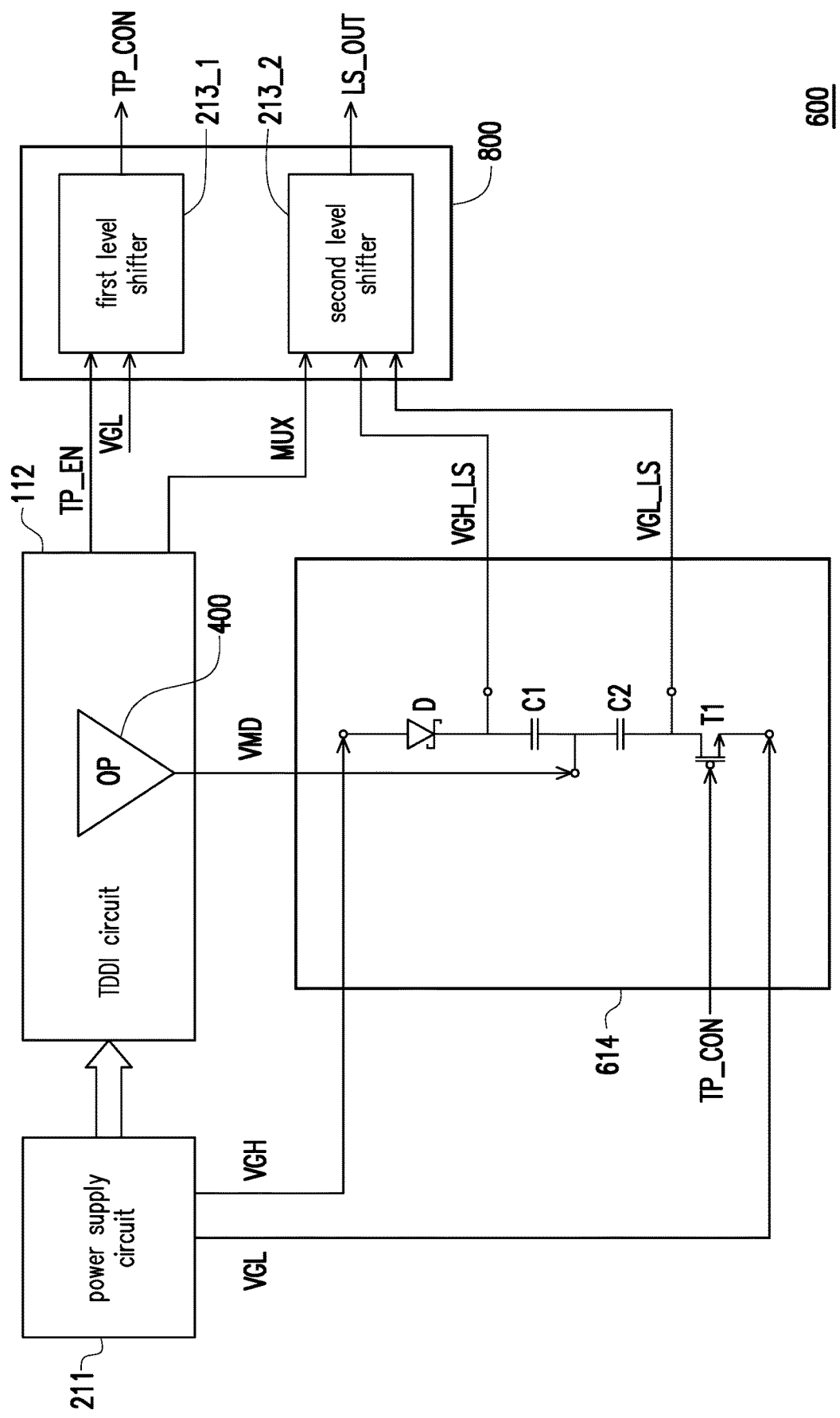
FIG. 6 is a schematic block diagram illustrating a driver circuit according to another embodiment of the invention.

FIG. 6 is a schematic block diagram illustrating a driver circuit according to another embodiment of the invention. Referring to FIG. 6, the driver circuit 600 includes the TDDI circuit 112, an external circuit 614, the power supply circuit 211 and a level shifter circuit 800. The level shifter circuit 800 includes the first level shifter 213_1 and the second level shifter 213_2. The first level shifter 213_1 is disposed outside of the external circuit 614 and integrated with the second level shifter 213_2 to form a semiconductor chip.

In the present embodiment, the external circuit 614 includes a diode device D, a first capacitor C1, a second capacitor C2 and a switch device T1 connected in series. The switch device T1 is controlled by the first control signal TP_CON from the first level shifter 213_1. The switch device T1 may be a high voltage N-type metal oxide semiconductor (HVNMOS) transistor, but the invention is not limited thereto.

The TDDI circuit 112 outputs a second control signal TP_EN to the first level shifter 213_1. The first level shifter 213_1 is configured to receive the second control signal TP_EN the second input voltage VGL. The first level shifter 213_1 generates the first control signal TP_CON on the basis of the second input voltage VGL according to the second control signal TP_EN.

Figure 7:
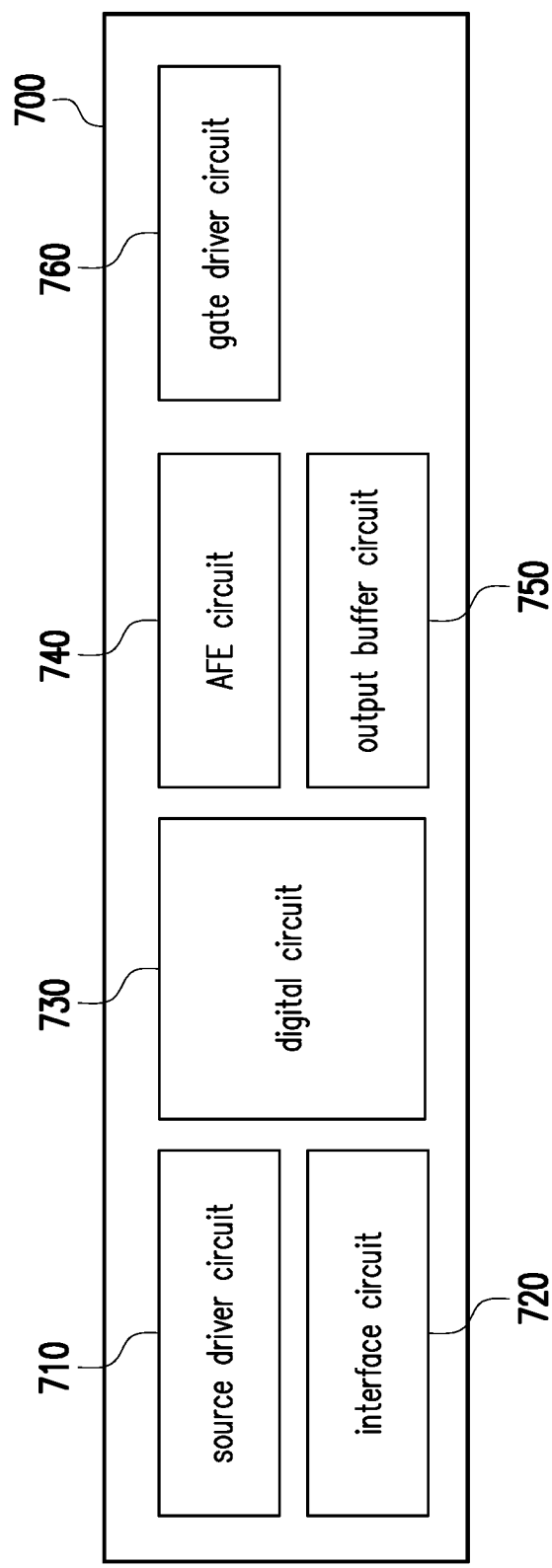
FIG. 7 is a schematic block diagram illustrating a TDDI circuit according to an embodiment of the invention.

FIG. 7 is a schematic block diagram illustrating a TDDI circuit according to an embodiment of the invention. Referring to FIG. 4A and FIG. 7, the switch device T1 of FIG. 4A has a first voltage endurance, and the TDDI circuit 700 has a second voltage endurance. The first voltage endurance is larger than the second voltage endurance.

To be specific, the external circuit 114 includes the switch device T1 which is a HVNMOS transistor, for example. The TDDI circuit 800 includes a source driver circuit 710, an interface circuit 720, a digital circuit 730, an analog front end (AFE) circuit 740, an output buffer circuit 750 and a gate driver circuit 760. The source driver circuit 710, the AFE circuit 740 and the output buffer circuit 750 include middle voltage (MV) devices. The interface circuit 720, the digital circuit 730 and the gate driver circuit 760 include low voltage (LV) devices.

In the present embodiment, the switch device T1 is a high voltage (HV) device. The TDDI circuit 800 includes the MV devices and the LV devices. Therefore, the voltage endurance of the switch device T1 is larger than the voltage endurance of the TDDI circuit 800.

In addition, enough teaching, suggestion, and implementation illustration for hardware structures of the source driver circuit 710, the interface circuit 720, the digital circuit 730, the AFE circuit 740, the output buffer circuit 750 and the gate driver circuit 760 can be obtained with reference to common knowledge in the related art.

In an embodiment, the output buffer circuit 750 may include a digital-to-analog converter (DAC) and the output buffer 400. The DAC receives and converts a control signal of digital format into a control signal of analog format. The output buffer 400 amplifies the control signal of analog format to generate and output the reference signal VMD to the external circuit 114.

In an embodiment, for TDDI application, the low voltage may be a voltage located between 1.0V~1.5V, the middle voltage may be a voltage located between 3.3V~7V, and the high voltage may be a voltage located between 8V~32V.

In summary, in the embodiments of the invention, the TDDI circuit provides the synchronization-driving voltage of HV during the touch sensing period via the external circuit. The TDDI circuit simply includes MV devices and/or LV devices and thus is not limited to be manufactured by HV process. The TDDI circuit can work with cheaper and more efficient level shifters or gate drivers. Since the TDDI circuit simply includes MV devices and/or LV devices, temperature variation of chips and electromagnetic interference due to HV devices are reduced, and complexity of the TDDI circuit is simple.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driver circuit, configured to drive a display panel to perform a display operation and a touch sensing operation, the driver circuit comprising:
   a touch and display driver integration (TDDI) circuit, configured to drive the display panel to perform the display operation and the touch sensing operation during a display period and a touch sensing period, respectively, wherein the TDDI circuit outputs a reference signal; and an external circuit, disposed outside of the TDDI circuit, and configured to output a first output voltage and a second output voltage on the basis of the reference signal from the TDDI circuit, wherein the first output voltage is larger than the second output voltage, wherein the external circuit comprises a switch device controlled by a first control signal which is different from the reference signal, and the switch device is turned on by the first control signal during the display period, and the switch device is turned off by the first control signal during the touch sensing period.

2. The driver circuit of claim 1, further comprising:
a power supply circuit, coupled to the external circuit, and configured to output a first input voltage and a second input voltage, wherein the external circuit receives the first input voltage and the second input voltage from the power supply circuit, and the first input voltage is larger than the second input voltage.

3. The driver circuit of claim 2, wherein the external circuit generates the first output voltage on the basis of the reference signal according to the first input voltage, and the external circuit generates the second output voltage on the basis of the reference signal according to the second input voltage.

4. The driver circuit of claim 1, wherein the switch device has a first voltage endurance, the TDDI circuit has a second voltage endurance, and the first voltage endurance is larger than the second voltage endurance.

5. The driver circuit of claim 1, wherein the external circuit further comprises:
a diode device, comprises a first end and a second end, wherein the first end of the diode device is coupled to the power supply circuit and serves as an input end to receive the first input voltage, and the second end of the diode device serves as an output end to output the first output voltage;
a first capacitor, comprises a first end and a second end, wherein the first end of the first capacitor is coupled to the second end of the diode device, and the second end of the first capacitor is coupled to the TDDI circuit to receive the reference voltage; and
a second capacitor, comprises a first end and a second end, wherein the first end of the second capacitor is coupled to the second end of the first capacitor, and the second end of the second capacitor is coupled to the switch device,
wherein the switch device comprises a first end, a second end and a control end, the first end of the switch device is coupled to the second end of the second capacitor and serves as an output end to output the second output voltage, and the second end of the switch device serves as an input end to receive the second input voltage, and the control end of the switch device is coupled to the first control signal.

6. The driver circuit of claim 1, wherein
the switch device comprises a first end, a second end and a control end, the first end of the switch device is coupled to the power supply circuit and serves as an input end to receive the first input voltage, and the second end of the switch device serves as an output end to output the first output voltage, wherein the external circuit further comprises:
a first capacitor, comprises a first end and a second end, wherein the first end of the first capacitor is coupled to the second end of the switch device, and the second end of the first capacitor is coupled to the TDDI circuit to receive the reference voltage;
a second capacitor, comprises a first end and a second end, wherein the first end of the second capacitor is coupled to the second end of the first capacitor; and
a diode device, comprises a first end and a second end, wherein the first end of the diode device is coupled to the second end of the second capacitor and serves as an output end to output the second output voltage, and the second end of the diode device serves as an output end to receive the second input voltage.

7. The driver circuit of claim 1, further comprising a first level shifter, coupled to the TDDI circuit, wherein the TDDI circuit outputs a second control signal to the first level shifter, and the first level shifter is configured to receive the second control signal and further receive the first input voltage or the second input voltage,
wherein the first level shifter generates the first control signal on the basis of the first input voltage or the second input voltage according to the second control signal.

8. The driver circuit of claim 7, wherein the first level shifter is disposed in the external circuit.

9. The driver circuit of claim 7, further comprising:
a second level shifter coupled to the external circuit and disposed outside of the external circuit, and configured to receive the first output voltage and the second output voltage from the external circuit,
wherein the first level shifter is disposed outside of the external circuit and integrated with the second level shifter to form a semiconductor chip.

10. The driver circuit of claim 2, wherein the TDDI circuit and the power supply circuit are implemented as different semiconductor chips.

11. The driver circuit of claim 1, wherein the reference signal is a ground voltage during the display period.

12. The driver circuit of claim 1, wherein the reference signal is a synchronization-driving voltage during the touch sensing period.

13. The driver circuit of claim 12, wherein the first output voltage and the second output voltage have the same amplitude, phase and frequency as that of the reference signal.

* * * * *